United States Patent
Werson et al.

(10) Patent No.: US 6,499,966 B1
(45) Date of Patent: Dec. 31, 2002

(54) MOTOR DRIVEN PUMP

(75) Inventors: John Michael Werson, Eastleigh (GB); Robert William Beaven, Bristol (GB)

(73) Assignee: Automative Motion Technology, Ltd., Andover (GB)

( * ) Notice: Subject to any disclaimer, the term of this patent is extended or adjusted under 35 U.S.C. 154(b) by 0 days.

(21) Appl. No.: 09/762,518

(22) PCT Filed: Jul. 26, 1999

(86) PCT No.: PCT/GB99/02441

§ 371 (c)(1),
(2), (4) Date: Apr. 5, 2001

(87) PCT Pub. No.: WO00/08338

PCT Pub. Date: Feb. 17, 2000

(30) Foreign Application Priority Data

Aug. 6, 1998 (GB) ............................................. 9817155
Oct. 6, 1998 (GB) ............................................. 9821795

(51) Int. Cl.[7] ............................. F04B 17/00; F04B 35/04
(52) U.S. Cl. ................... 417/355; 417/356; 417/410.4; 417/423.12
(58) Field of Search ................................ 417/355, 356, 417/410.4, 410.1, 410.3, 423.11, 423.12

(56) References Cited

U.S. PATENT DOCUMENTS

| | | | | |
|---|---|---|---|---|
| 3,473,475 A | * | 10/1969 | Martini et al. ........... | 417/410.1 |
| 3,539,849 A | * | 11/1970 | Kampfen .................. | 310/67 R |
| 3,588,284 A | * | 6/1971 | Sturlason .................. | 417/410.1 |
| 3,790,309 A | * | 2/1974 | Volz ............................ | 417/368 |
| 4,384,828 A | * | 5/1983 | Rembold et al. ........... | 417/356 |
| 4,836,147 A | * | 6/1989 | Morris ..................... | 123/41.44 |
| 5,547,350 A | * | 8/1996 | Rawal et al. ............... | 417/354 |
| 5,947,704 A | * | 9/1999 | Hsieh ..................... | 417/423.12 |

FOREIGN PATENT DOCUMENTS

| | | | | |
|---|---|---|---|---|
| DE | 37 01 586 C2 | 11/1988 | ............. | F04C/2/16 |
| DE | 39 37 345 A1 | 5/1991 | ............. | F04C/2/00 |
| DE | 41 23 384 A1 | 1/1993 | ............. | F04C/13/00 |
| DE | 197 45 278 A1 | 4/1999 | ............. | F15B/1/02 |
| EP | 0 323 834 A2 | 7/1989 | ............. | F04C/2/16 |
| EP | 0 736 667 A2 | 10/1996 | ............. | F01C/1/16 |
| GB | 382277 | 10/1932 | | |
| GB | 699436 | 11/1953 | | |
| GB | 743739 | 1/1956 | | |
| GB | 1198685 | 7/1970 | | |
| GB | 1 398 079 | 6/1975 | | |
| GB | 1 569 842 | 6/1980 | | |
| JP | 05211741 | 8/1993 | .......... | H02K/5/132 |
| JP | 60-81491 | 5/1995 | ........... | F04C/15/00 |
| WO | WO 96/14511 | 5/1996 | ........... | F04C/15/00 |

* cited by examiner

Primary Examiner—Charles G. Freay
Assistant Examiner—Timothy P. Solak
(74) Attorney, Agent, or Firm—Dykema Gossett PLLC

(57) ABSTRACT

A motor driven pump comprises a motor stator (30), a motor rotor (10) operable to rotate around the outside of the stator (30) and a pump mechanism (40, 50) driven by the motor rotor (10) and disposed at least partly inside the motor stator (30).

10 Claims, 5 Drawing Sheets

MOTOR DRIVEN PUMP

This application claims priority to International Application No. PCT/GB99/02441 filed Jul. 26, 1999. The International Application was published in the English language on Feb. 17, 2000 as International Publication No. WO 00/08338 and itself claims the benefit of United Kingdom Application No. 9817155.6 filed Aug. 6, 1998 and United Kingdom Application No. 9821795.3 filed Oct. 6, 1998.

BACKGROUND OF THE INVENTION

1. Field of the Invention

This invention relates to motor driven pumps.

2. Description of Related Art

The usual arrangement when a motor drives a pump is to have the pump inline with the motor unit, as detailed, for example in DE-A-4 123 384. Unfortunately this means that the total length of the unit is at least equal to the length of the motor plus the length of the pump, and the combination may often be too long to use in confined spaces. Also the amount of materials and components needed are no less than for manufacturing the two items separately.

In order to reduce the length of pump-motor combinations two types of solution have been devised. The first is to use the rotor of the motor as the rotor of the pump, for example by threading the rotor with machined helical feed channels as in DE-A-3-937 345. This reduces the size of the pump and is a simple design requiring few components, but the pressures achieved by this pump will be very low, merely one or two bar gauge, and there is no possibility of using a more complex design of pump, for example a multiple rotor screw pump, where a driven power rotor acts in combination with one or more ancillary rotors. The design of a multiple rotor screw pump is detailed in EP-A-0 736 667.

The second previously proposed design overcomes this problem to some extent. The arrangement uses a screw pump where the central pump rotor does not turn while the ancillary screws or rotors turn with the motor rotor. This type of pump is illustrated in DE-A-3 701 586. This type of pump enables high pressures to be reached, but still contains some significant disadvantages. Two housings are required—one for the pump unit and a second for the stator assembly, which increases the bulk and the cost of the unit. The unit is also disproportionately elongate.

SUMMARY OF THE INVENTION

The present invention seeks to reduce the size and components of the motor driven pump. The invention provides a motor driven pump comprising: a stator; a rotor, coaxial with the stator, operable to rotate around the outside of the stator and a pump mechanism driven by the rotor and disposed at least partly inside the stator.

This invention provides a number of advantages compared to the prior art. In particular the stator may form part of the pump housing, reducing the number of components and the time consuming assembly required. The pumped fluid passes inside the stator and so the fluid flow through the pump may be used to cool the stator thus increasing the efficiency of the motor driven pump. This may be most effectively done when the pump housing abuts the stator, leading to efficient conduction of heat to the fluid flowing through the pump. The integration of the pump within the motor means that the mechanical and hydraulic components of the pump are acoustically shielded leading to low levels of pump audible noise. The unit can also be made to be more compact than an equivalent motor inline with a pump which means that it has many applications in confined spaces, for example under a car bonnet as part of the power steering system.

Furthermore it is possible to use the power rotor or the ancillary rotors of the pump as a hydraulic bearing for the rotor. This reduces the number of components necessary, reducing the cost and assembly time of the unit. One further bearing may function as the main bearing for both the motor rotor and the pump to ensure that there is no clash with the stator and no audible noise is caused by the vibration of the rotor. This provides an inherent advantage over the previous designs where the motor rotor was an integral part of the pump.

Lastly the system housing may contain the reservoir of fluid necessary for the running of the pump, further reducing the noise and vibration of the unit.

BRIEF DESCRIPTION OF THE DRAWINGS

Embodiments of the invention will now be described with reference to the accompanying drawings, throughout which parts are referred to by like references and in which.

DETAILED DESCRIPTION OF THE INVENTION

Figure 1:
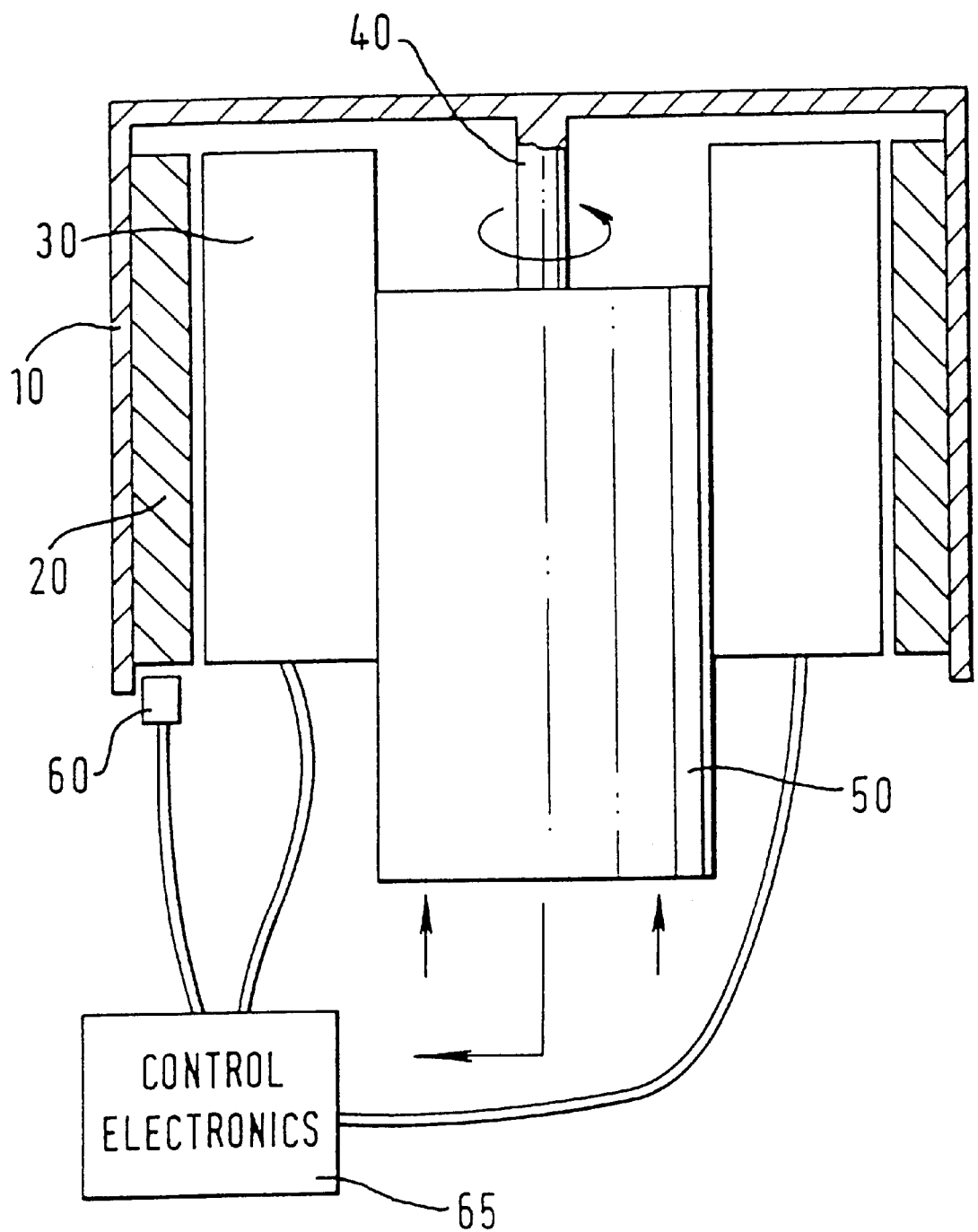
FIG. 1 schematically shows an external rotor motor driven pump.

FIG. 1 schematically illustrates a motor driven pump comprising an external rotor 10, a stator 30 and a screw pump housing 50. Permanent magnets 20 are affixed to the rotor 10 and a position sensor 60 detects the rotational position of the rotor 10. This information is relayed to control electronics 65 which may thus deduce the relative positions and speeds of the stator and rotor and so switch on winding sets in the stator which relate to the various phases of the motor. The electronic control of d.c. brushless motors is well established and so will not be described here in detail.

A significant feature of the motor driven pump is that the rotor 10, is an external rotor: i.e. it rotates around the outside of the stator 30. The heat conducting pump housing 50 abuts the stator, which means cooling of the stator may take place as fluid flows through the screw pump, see FIG. 3 below. The power rotor 40 of the pump, shown in further detail in FIG. 2, is driven from the rotor of the motor and acts as the central shaft for the motor rotor.

Figure 2:
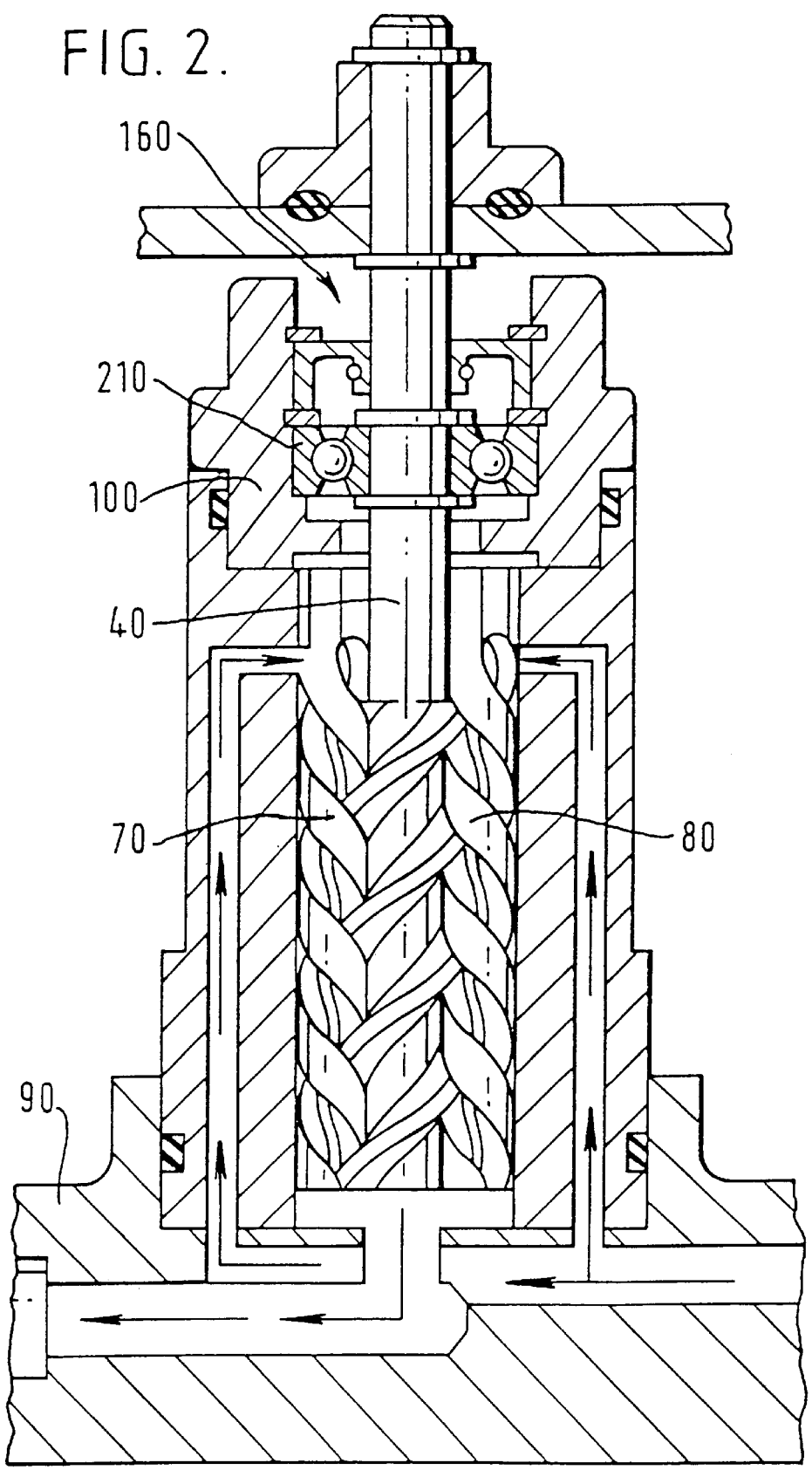
FIG. 2 schematically gives further detail of a screw pump mechanism in the pump of FIG. 1.
Figure 3:
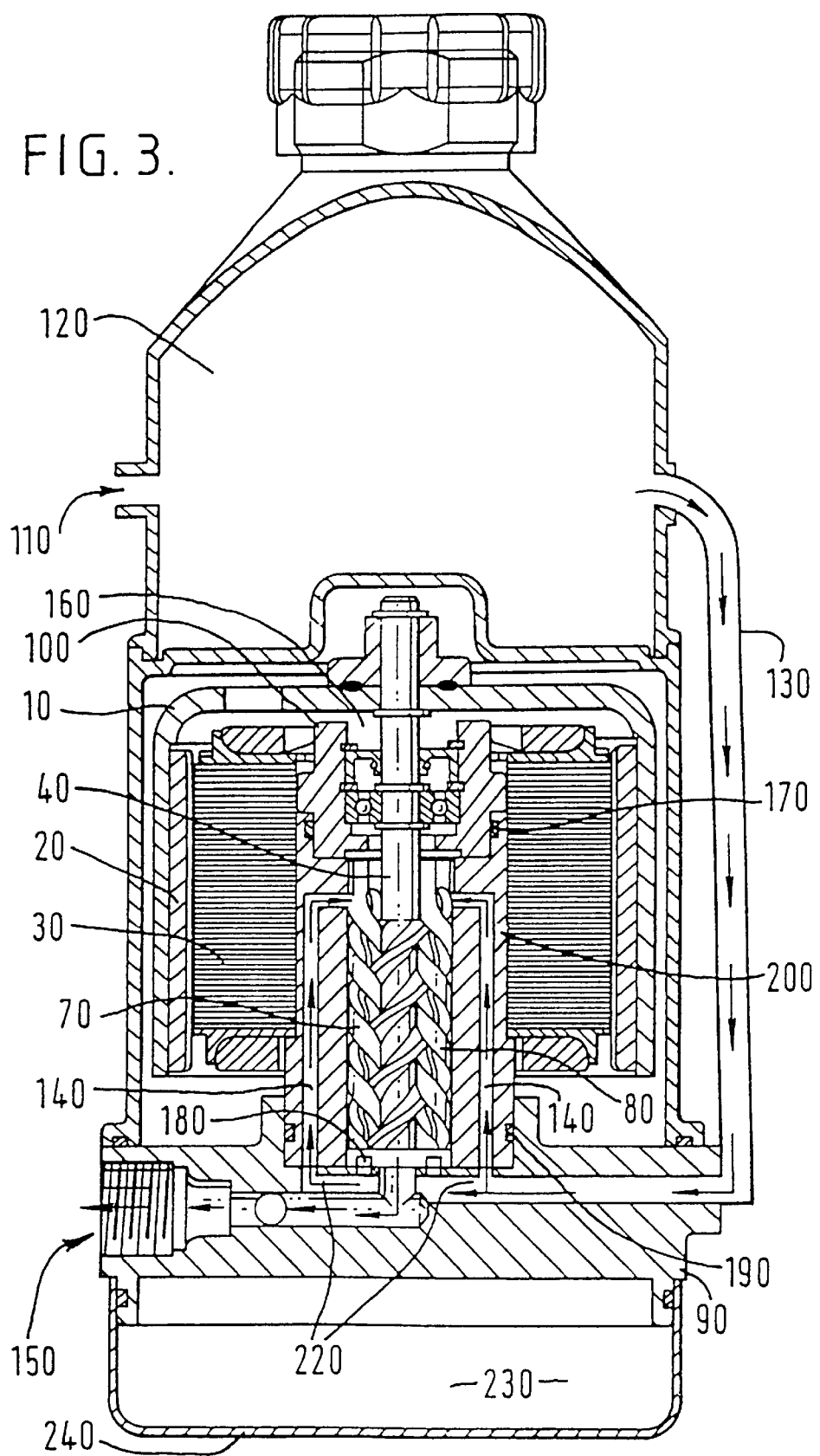
FIG. 3 outlines schematically the fluid flow through the entire pump.

It can be seen in FIGS. 2 and 3 that in this embodiment the central shaft of the pump acts as the power rotor 40. However it is easy to envisage an alternative embodiment where the central shaft remains stationary and the external rotor 10 drives ancillary pump rotors 70 and 80. A manifold 90 and an endcap 100 complete the pump unit.

The fluid flow through the pump is shown in further detail in FIG. 3. Low pressure fluid enters the pump from an external system through an inlet 110 in an reservoir 120. It then is fed to the manifold 90 through a tube 130 which maybe incorporated into the external casing of the pump. Fluid then flows through manifold inlet tubes 140 until it is next to the endcap 100 where it enters the pump. As the central rotor 40 of the pump rotates the ancillary rotors 70 and 80 rotate likewise forming chambers between the threads of the screw which force the fluid down the screw pump to the high pressure outlet 150.

The endcap contains a seal 160 and has a seal 170 around it, which stop fluid escaping into the stator 30 or the part of the motor which contains the magnets 20. The manifold 90 has two seals 180 and 190 between it and the housing assembly 200. The seal 190 provides a seal between the low pressure fluid and the stator 30. The seal 180 provides a seal between the low pressure and the high pressure fluid. The endcap 100 also contains a bearing 210 which acts as the bearing for the motor and the screw pump so that there is no clash with the stator and no audible noise caused by the vibration of the rotor. The manifold 90 contains the high pressure outlet 150, the low pressure inlets 220 and also a space 230 for the control electronics. The control electronics are protected by a cover 240.

Figure 4:
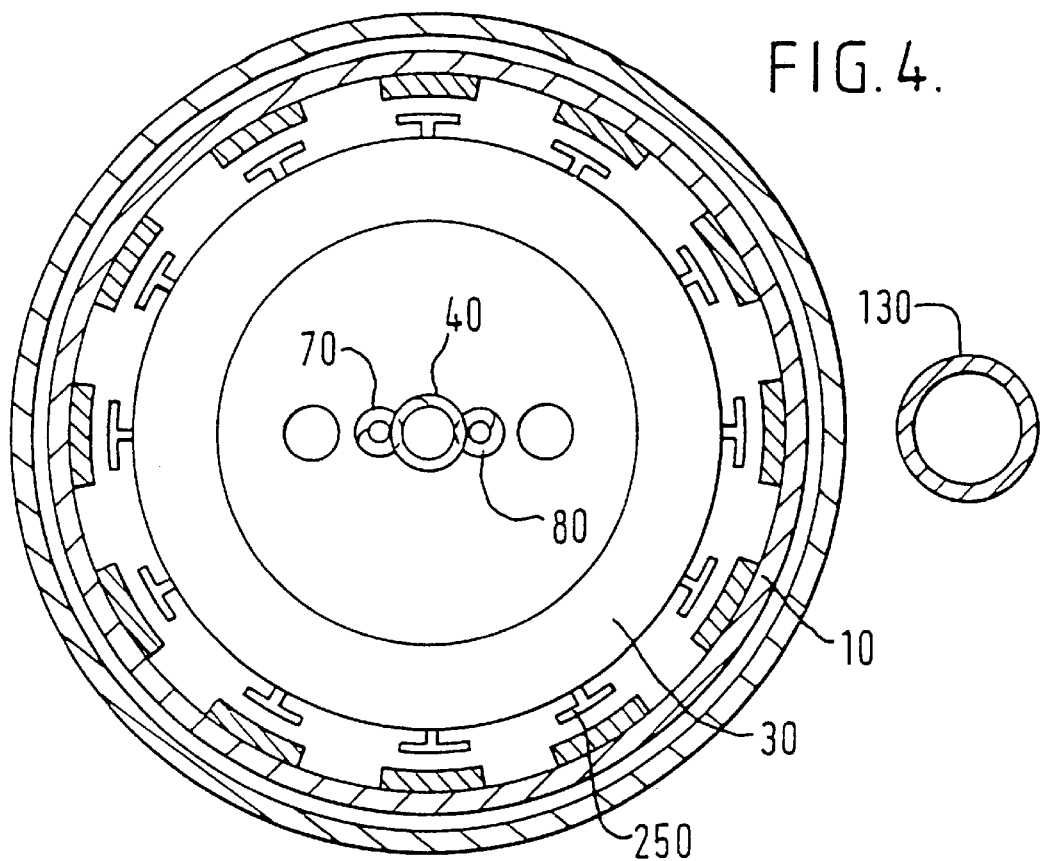
FIG. 4 shows a schematic cross section of the motor driven pump.

The motor components are the stator 30 around which the rotor 10 rotates. Attached axially around the rotor are permanent magnets 20, shown in cross section in FIG. 4. The windings of the stator are wound around T-sections 250. The magnetic flux is directed down one T section and up an adjacent one; when combined with the current in the windings it causes a torque which turns the rotor 10.

Figure 5:
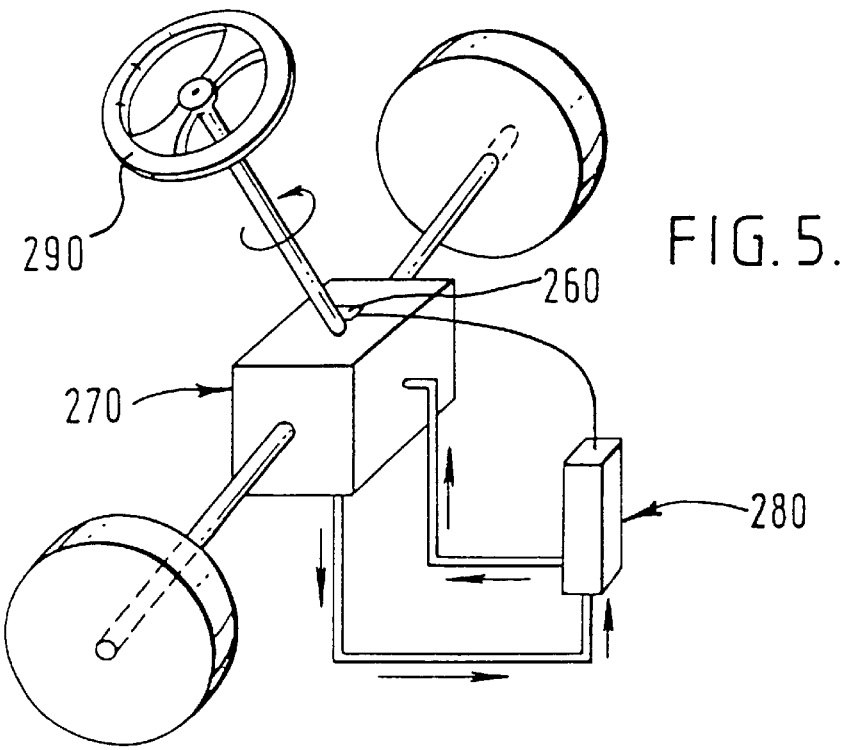
FIG. 5 schematically shows the pump in use.

The pump is shown in use in a sample application, a car steering system, in FIG. 5. The pump continually runs on idle—about 1000 rpm. A position sensor 260 detects when the steering wheel 290 is turned and the pump electronics rapidly ramp up the pump to its working speed of 5000–6000 rpm. The hydraulic fluid is delivered to the steering system 270 at high pressure and returns to the pump 280 at low pressure. After completion of the steering movement the pump motor returns to its idle speed.

Figure 6:
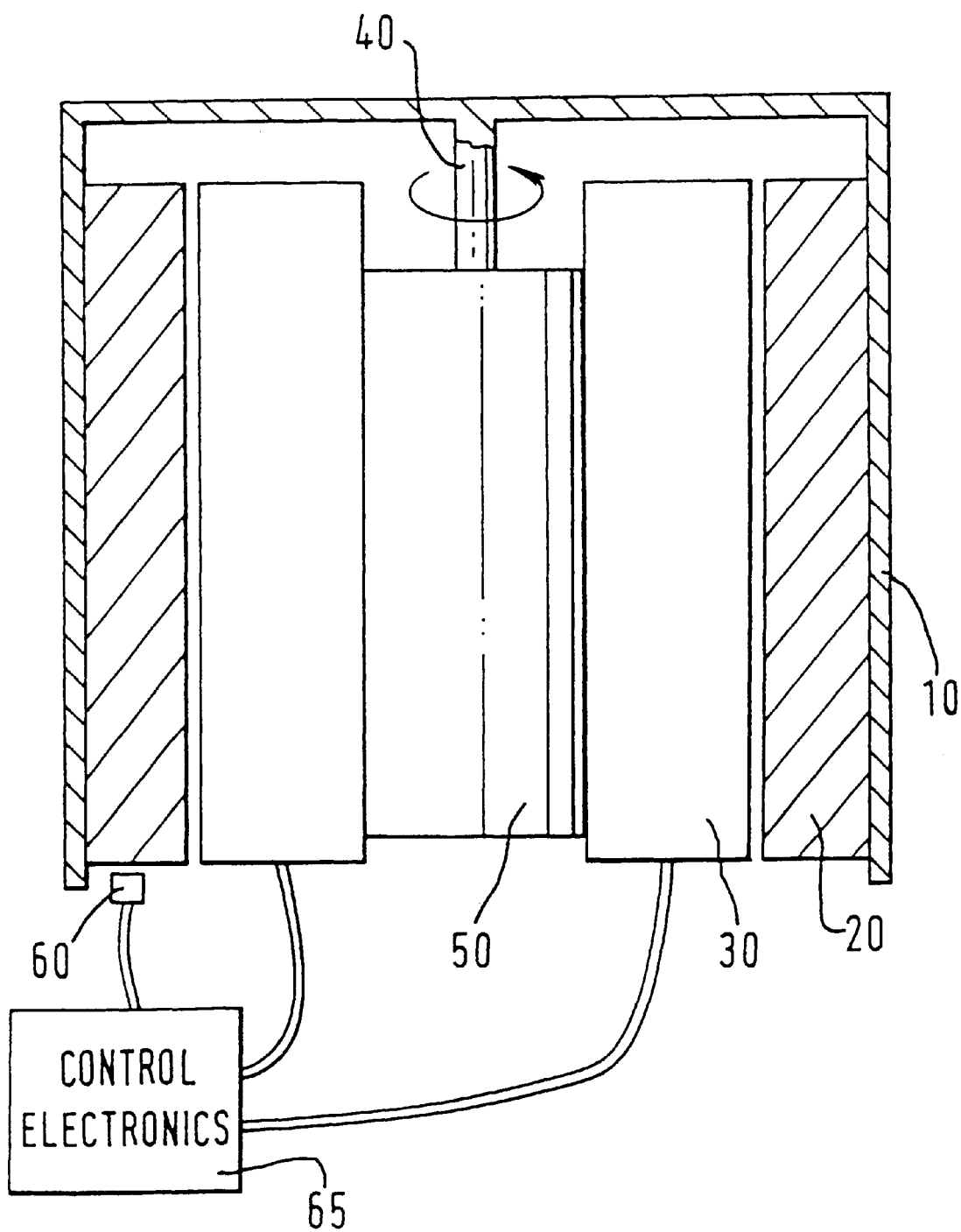
FIG. 6 shows schematic details of an alternative embodiment where the pump is entirely enclosed by the stator of the motor.

This embodiment is only one of many possible embodiments of this invention. An alternative embodiment is shown in FIG. 6 where the pump is contained entirely within the stator 30. Other types of pumps and types of motor are also possible. Many other applications are also possible; the pump would prove useful as an oil or fuel pump in a confined space.

The skilled person will appreciate that it is possible to combine many different types of motors and pumps, for example brushed d.c. motors, induction motors or switched reluctance motors with any of a roller vane pump, a geared pump or an internal gear pump in the manner described, even though the particular example detailed above relates to a screw type of pump and a brushless d.c. motor.

What is claimed is:

1. A motor driven pump comprising: a motor stator; a motor rotor operable to rotate around the outside of the stator about a central shaft and a pump mechanism driven by the motor rotor and disposed about the central shaft at least partly inside the motor stator the motor rotor being sealed from fluid flowing through the pump mechanism, the pump mechanism including a plurality of pump rotors at least partly disposed inside the motor stator of which one is constituted by the central shaft, and a single bearing is provided for the central shaft which acts as a bearing for both the motor and pump.

2. A motor driven pump, according to claim 1, in which the stator and the pump mechanism are arranged with respect to one another to provide a heat conduction path between the stator and fluid flowing through the pump mechanism.

3. A motor driven pump according to claim 1 in which the pump mechanism has a housing which abuts an inner surface of the stator.

4. A motor driven pump according to claim 1 comprising two chambers where a first chamber contains the motor stator, the motor rotor and the pump mechanism and a second chamber contains a reservoir of the fluid to be pumped by the pump mechanism.

5. A motor driven pump according to claim 1 in which the central shaft rotates with the motor rotor and acts as a power rotor of the pump mechanism.

6. A motor driven pump according to claim 5 in which the plurality of pump rotors comprise a power rotor and at least one ancillary rotor adjacent to the power rotor.

7. A motor driven pump according to claim 1 in which the pump mechanism is a screw mechanism.

8. A motor driven pump according to claim 1 in which the motor is a brushless d.c. motor.

9. A motor driven pump according to claim 1 wherein the pump mechanism is disposed substantially entirely within the stator.

10. A motor vehicle power steering system, the system comprising a hydraulically driven steering arrangement; and a motor driven pump for supplying hydraulic fluid to the steering arrangement the motor driven pump comprising a motor stator; a motor rotor operable to rotate around the outside of the stator about a central shaft and a pump mechanism driven by the motor rotor and disposed about the central shaft at least partly inside the motor stator the motor rotor being sealed from fluid flowing through the pump mechanism, the pump mechanism including a plurality of pump rotors at least partly disposed inside the motor stator of which one is constituted by the central shaft, and a single bearing is provided for the central shaft which acts as a bearing for both the motor and pump.

* * * * *